US011115459B2

(12) United States Patent
Krishnan et al.

(10) Patent No.: US 11,115,459 B2
(45) Date of Patent: Sep. 7, 2021

(54) GENERIC AND CONFIGURABLE TECHNIQUE FOR WEBHOOK VALIDATION WITH ARBITRARY APPLICATIONS

(71) Applicant: International Business Machines Corporation, Armonk, NY (US)

(72) Inventors: Subramanian Krishnan, Mysore (IN); Varun Pal, Marathahalli (IN); Bharathi Venkatasubramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 15/335,274

(22) Filed: Oct. 26, 2016

(65) Prior Publication Data
US 2018/0115595 A1 Apr. 26, 2018

(51) Int. Cl.
*H04L 29/08* (2006.01)
*H04L 29/06* (2006.01)

(52) U.S. Cl.
CPC ........... *H04L 67/025* (2013.01); *H04L 67/02* (2013.01); *H04L 67/26* (2013.01); *H04L 63/08* (2013.01)

(58) Field of Classification Search
CPC ...... H04L 67/025; H04L 41/082; H04L 63/08
USPC ........................................................ 709/204
See application file for complete search history.

(56) References Cited

U.S. PATENT DOCUMENTS

| | | | |
|---|---|---|---|
| 9,313,532 B1 | 4/2016 | Arya et al. | |
| 2004/0225878 A1* | 11/2004 | Costa-Requena | H04L 63/08 |
| | | | 713/150 |
| 2014/0373099 A1* | 12/2014 | Durbha | H04L 63/10 |
| | | | 726/4 |
| 2016/0142446 A1 | 5/2016 | Boerjesson et al. | |
| 2016/0255066 A1* | 9/2016 | Green | H04W 4/70 |
| | | | 726/4 |

OTHER PUBLICATIONS

Chan, Derek, "Ezypay Web Hooks Usage Guide", Direct Debit API Documentation, 1.2, Feb. 20, 2014, pp. 1-8.
A Django WebHook handler for Phaxio, Django Phaxio, Release 1.0.0, May 12, 2016, pp. 1-13.

* cited by examiner

*Primary Examiner* — Kevin S Mai
(74) *Attorney, Agent, or Firm* — Patterson + Sheridan, LLP

(57) ABSTRACT

Techniques are disclosed for validating a webhook post by a receiver. The receiver receives an HTTP (Hypertext Transfer Protocol) request associated with the webhook post from an application. The receiver extracts at least one parameter from the HTTP request, to be used for validation of the webhook post. The receiver, obtains, based on the at least one parameter, configuration information associated with validating the webhook post from a configuration template, wherein the configuration template comprises configuration information associated with validating webhook posts from each of a plurality of applications. The receiver then validates the webhook post based on the configuration information.

20 Claims, 5 Drawing Sheets

GENERIC AND CONFIGURABLE TECHNIQUE FOR WEBHOOK VALIDATION WITH ARBITRARY APPLICATIONS

FIELD

The present disclosure relates to techniques for validating requests received over a network. More specifically, the present disclosure relates to using a generic and configurable technique for validating webhook calls from arbitrary applications.

BACKGROUND

A webhook is a method of augmenting or altering the behavior of a web page or web application with custom callbacks. These callbacks may be maintained, modified, and managed by third-party users and developers who may not necessarily be affiliated with the originating website or application.

Webhooks are "user-defined HTTP callbacks", for example, an HTTP POST that occurs when something happens, e.g., a simple event-notification via HTTP post. They are usually triggered by some event, such as pushing code to a repository or a comment being posted to a blog. When the relevant event occurs, the source site makes an HTTP request to the URI configured for the webhook. Users can configure them to cause events on one site to invoke behavior on another. The action taken may be anything. Common uses are to trigger builds with continuous integration systems or to notify bug tracking systems. Since they use HTTP, webhooks can be integrated into web services without adding new infrastructure. In some cases, webhooks are implemented using HTTP Secure (HTTPS) callbacks. In addition some webhooks are invoked via HTTP GET instead of HTTP POST.

In many cases, the webhooks are exposed to the public internet, for example to integrate SaaS applications providing webhook. This causes security vulnerabilities because anyone who has the URL of the webhook can invoke it to inject malicious events into the receiver. To protect against this, many applications provide a mechanism for the receiver of a webhook callback to know and validate that the webhook invocation is from an authentic source. However, different applications may support different validation techniques for validation of webhook calls at a receiver. Some examples of the security mechanisms employed by webhook validation include HTTP basic authentication, shared secret in URL or header, signing or hashing of the payload and URL. Even within a chosen mechanism, there generally are variations from application to application in terms of the signing/hashing algorithm, digest headers used etc.

From the perspective of a developer interacting with many systems, these variations in validation mechanisms make it difficult for the receiver to validate the webhook invocation in a uniform and simple way.

SUMMARY

One embodiment presented herein includes a computer-implemented method for validating a webhook post. The method generally includes receiving an HTTP (Hypertext Transfer Protocol) request associated with the webhook post from an application, extracting at least one parameter from the HTTP request, to be used for validation of the webhook post, obtaining, based on the at least one parameter, configuration information associated with validating the webhook post from a configuration template, wherein the configuration template comprises configuration information associated with validating webhook posts from each of a plurality of applications, and validating the webhook post based on the configuration information.

One embodiment presented herein includes an apparatus for validating a webhook post. The apparatus generally includes means for receiving an HTTP (Hypertext Transfer Protocol) request associated with the webhook post from an application, means for extracting at least one parameter from the HTTP request, to be used for validation of the webhook post, means for obtaining, based on the at least one parameter, configuration information associated with validating the webhook post from a configuration template, wherein the configuration template includes information associated with validating webhook posts from a plurality of applications, and means for validating the webhook post based on the configuration information.

One embodiment presented herein includes a computer program product for validating a webhook post, the computer program product comprising a computer readable storage medium having program instructions embodied therewith, the program instructions executable by a computer to cause the computer to receive an HTTP (Hypertext Transfer Protocol) request associated with the webhook post from an application, extract at least one parameter from the HTTP request, to be used for validation of the webhook post, obtain, based on the at least one parameter, configuration information associated with validating the webhook post from a configuration template, wherein the configuration template comprises configuration information associated with validating webhook posts from each of a plurality of applications, and validate the webhook post based on the configuration information.

DETAILED DESCRIPTION

Figure 1:
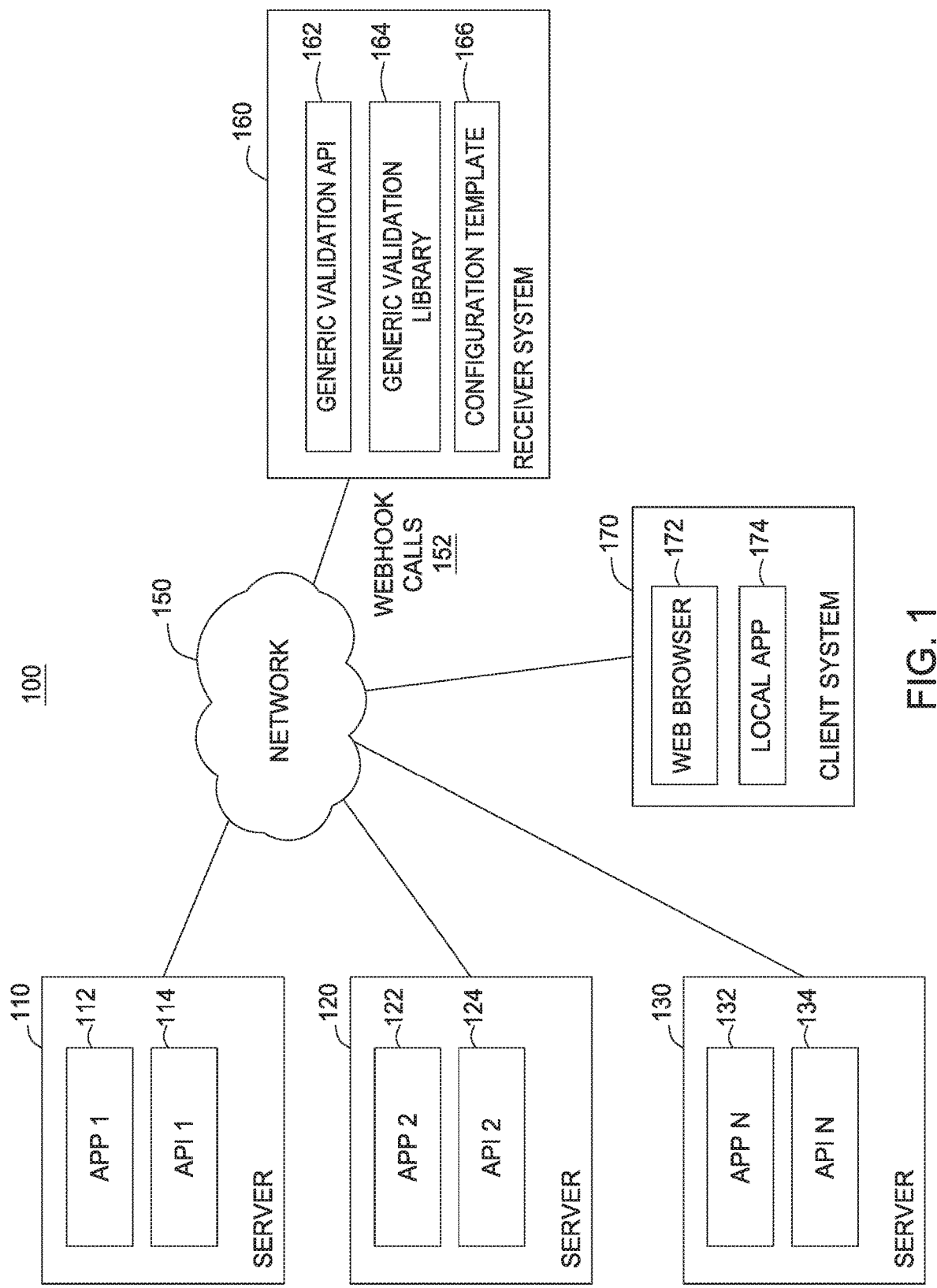
FIG. 1 illustrates an example computing environment 100 used to perform webhook validation, in accordance with certain aspects of the present disclosure.

As noted above, Webhooks are user-defined HTTP callbacks, for example, an HTTP POST triggered by a specific event, e.g., a simple event-notification via HTTP post. They are usually triggered by some event, such as pushing code to a repository or a comment being posted to a blog. When the relevant event occurs, a source site directs an HTTP request to the URI configured for the webhook. Users can configure a webhook to cause events on one site that invoke behavior on another. Common uses are to trigger builds with continuous integration systems or to notify bug tracking systems. Since they use HTTP, webhooks can be integrated into web services without adding new infrastructure.

A web application implementing Webhooks POSTs a message to a URL when certain events happen. When a web application enables users to register their own URLs, users can then extend, customize, and integrate that application with their own custom extensions or even with other applications around the web. For the user, Webhooks are a way to receive valuable information when an event happens, rather than continually polling for that data and receiving nothing valuable most of the time. Webhooks have enormous potential and are limited only by imagination of the developer.

In one example, webhooks can be used for receiving data in real time. As noted above, webhooks eliminate the need for polling every couple of minutes to find out if there is new information. A webhook may just be registered and data may be received as soon as it is available.

In another example, webhooks can be used for receiving data and forwarding it. In this use case, a webhook not only receives real-time data, but goes on to do something new and meaningful with it, for example, trigger actions unrelated to the original event. For example, a webhook may trigger a Twitter message whenever a new product is added on a commerce web site.

An application that supports webhooks generally allows users to specify URLs (e.g., using an API) for various events. The application may post data to those URLs when the events occur.

Generally, a webhook sender (e.g., an application exposing events) exposes events that a client (e.g., another application) can subscribe to. The events may describe observable changes to the system, for example, that a new data item has been inserted, that a process has been completed, or something else. A webhook receiver subscribes by registering a webhook generally including a URL for where the event notification should be posted in the form of an HTTP POST request, a set of filter describing the particular events for which the webhook should be fired, a secret key which is used to sign the HTTP POST request, additional data which is to be included in the HTTP POST request including, for example, additional HTTP header fields or properties included in the HTTP POST request body. Once an event occurs, the matching webhook registrations are found and HTTP POST requests are submitted to the registered URIs. In some cases, an application may call a HTTP GET to invoke a webhook.

An ever increasing number of applications use webhooks for events integration. Some examples of such applications include Stripe, Github, Trello, Dropbox, Twilio, Slack, Facebook, EventBrite, Box and Shopify. Webhooks are generally exposed by event consumers for invocation by these event producing applications.

Certain applications (e.g., Stripe application) allow both private individuals and businesses to accept payments over the Internet. These applications focus on providing the technical, fraud prevention, and banking infrastructure required to operate online payment systems. Using these applications, web developers can integrate payment processing into their websites without having to register and maintain a merchant account. Some of these applications (e.g., Stripe application) use webhooks to notify users (e.g., merchants) about events that happen in the user's account. For example, an API allows a user to register a URL that is notified anytime an event happens in the user's account. For example, when an event occurs, for example, when a successful charge is made on a customer's subscription, an event object is created. This object contains all the relevant information about what just happened, including the type of event and the data associated with that event. The application then sends the event object to any URLs in the user account's webhook settings via an HTTP POST request.

Applications may use webhooks to update a customer's membership record in the merchant's database when a subscription payment succeeds, email a customer when a subscription payment fails, check out the dashboard if a dispute is filed, make adjustments to an invoice when its created and log an accounting entry when a transfer is paid.

Certain source code management systems (e.g., Github) use webhooks to allow a user to build or set up integrations which subscribe to certain events. When one of those events is triggered, an HTTP POST payload is sent to the webhook's configured URL. Webhooks can be used to update an external issue tracker, trigger CI builds, update a backup mirror, or deploy to a production server. Each webhook can be installed on an organization or a specific repository. Once installed, they will be triggered each time one or more subscribed events occur on that organization or repository.

As noted above, webhooks are exposed to the public internet, for example to integrate SaaS applications providing webhook. This causes security vulnerabilities because anyone who has the URL of the webhook can invoke it to inject malicious events into the receiver. To protect against this, many applications (e.g., Stripe, Github, etc.) provide a mechanism for the receiver of the webhook callback to know and validate that the webhook invocation is from an authentic source. However, different applications may support different validation techniques for validation of webhook calls. Some examples of the security mechanisms employed for webhook validation include HTTP basic authentication, shared secret in URL or header, signing or hashing of the payload and URL. Even within a chosen mechanism, there generally are variations from application to application in terms of the signing/hashing algorithm, digest headers used etc. Some common hashing algorithms in use are shal1 and sha256. Common digests include hex or base 64.

For example, with regard to a payment application (e.g., Stripe application), an attacker who knows an endpoint name and an event's ID associated with a Stripe webhook can force the server to process a legitimate event twice. If that event triggers some useful action, like generating a license key or enabling a delinquent account, the attacker may get away with something he is supposed to pay for, for free. To prevent this, some payment applications support using HTTP basic authentication on webhook endpoint. If only, the application posting the events knows the basic authentication password, this ensures that the request really comes from the application. The basic HTTP authentication includes the user generating a secret key, configuring an Event to require that secret to be used as basic authentication password, and specifying a webhook's URL in the application settings with the secret as a password in the URL.

Other applications (e.g., Github) allow users to set up a secret token and validate webhook calls. A user can create a secret token and set up an environment variable on the user's server that stores this token. When the secret token is set, the application uses it to create a hash signature with each payload. This hash signature is passed along with each request in the headers. The goal is to compute a hash using the already setup secret token and ensure that the hash from the application matches. For example, GitHub uses an HMAC hexdigest to compute the hash.

As a developer implementing software to interact with the webhook of a single system, the fact that different systems take different approaches do not cause a problem. However, from the perspective of the developer interacting with many systems, these variations in validation mechanisms make it difficult for the receiver to validate the webhook invocation in a uniform and simple way. Some applications (e.g., Stripe and GitHub) provide application specific validation libraries in NodeJS.

If the application exposing events provides such a validation library, the library may be called into an API provided by the application to implement the validation. While this method is easier relative to understanding the validation mechanism and writing a customized code, not all applications provide such validation libraries. In the absence of validation libraries, it is generally the receiver's responsibility to implement the appropriate webhook validation mechanism. For example, in the absence of validation libraries, if a consumer application wants to consume events from another application, the developer may need to understand how the particular application does webhook validation and may need to write a customized code for the consumer application.

When a consumer system supports receiving webhook HTTP POSTs from multiple applications using different webhook validation mechanisms, to add webhook validation support for any existing or new application, the developer has to understand and implement the validation mechanism as part of webhook handling. This is cumbersome, time consuming, hard to scale, test, maintain, and susceptible to errors. The problem is more acute and pronounced in case of an Application Integration Platform (e.g., IBM's App Connect), purpose of which, for example, is to integrate different applications and adding support for new applications is a regular and recurring activity. In certain aspects, an application integration platform also enables automating workflows between various SaaS and on-premise applications in an intuitive way by configuring Triggers and Actions.

Embodiments presented herein include techniques for validating webhook calls from different applications using different validation mechanisms. The technique includes providing a generic webhook validation library that works for arbitrary applications and validation techniques which has a single canonical API that accepts a webhook HTTP POST request, application name and application configuration associated to the posting application, and using code not specific to the posting application, performs validation of the webhook call.

FIG. 1 illustrates an example computing environment 100 configured to perform webhook validation, according to one embodiment. As shown, the computing environment 100 includes servers 110, 120 and 130, a receiver system 160 and a client system 170 connected to a network 150. The network 150, in general, may be a wide area network (WAN), local area network (LAN), wireless LAN (WLAN), personal area network (PAN), a cellular network, etc. In a particular embodiment, the network 150 is the Internet.

Each of the servers 110, 120 and 130 are included to be representative of a web application server running one or more applications that expose events and support event based webhook calls. Examples of such servers may include a payment management server, a source code management server, etc. As shown in FIG. 1, server 110 includes Application 1 (APP1) 112, server 120 includes Application 2 (APP2) 122, and server 130 includes Application n (APP n) 132. Each of the servers 110, 120, and 130 also include APIs 114, 124, and 134 respectively, which may be accessed by users wanting to consume webhook calls, to register URLs to which webhook calls may be posted and events that may trigger the webhook calls. In certain aspects, some applications have subscription api to register callback URLs whereas some other applications expect the user to register manually.

The receiver system 160 is included to be representative of a computing system capable of validating webhook calls from multiple applications (e.g., APPs 1, 2, n) using different validation techniques, in accordance with aspects of the present disclosure. As shown, the receiver system 160 may receive webhook calls (e.g., HTTP POST requests) 152 from each of the application servers 110, 120 and 130. The receiver system 160 provides a single canonical generic validation API 162 that accepts inputs including an HTTP request associated with a webhook call, the application name of the application attempting to post the HTTP request and application configuration information associated to the HTTP request, and uses a generic validation library 164 including code not specific to the application posting the request to perform validation of the webhook call. The receiver system includes a generic configuration template 166 that includes at least part of the configuration information associated with validating webhook calls for each application (e.g., APPs 1, 2, n). For example, the configuration information associated with a particular application may include one or more of a type of validation used by the application, a validation algorithm used, a digest method used, input fields of the HTTP request having information to be used for the validation, at least one of prefixes or suffixes to be applied, input field to be validated against, or credentials to be used for the validation algorithm. In an aspect, the configuration template provides steps that need to be followed for validating a webhook call. In an aspect, the generic validation library reads configuration information and the steps regarding validating a webhook request from the generic configuration template, and performs the validation based on the configuration.

In certain aspects, the configuration template is implemented as a JSON file which captures metadata for each application. The metadata may include information including whether a particular application performs signing based validation or secret based validation. If the validation is signing based, what algorithm is used for the signing. The configuration also includes the content that is used for signing, e.g., payload, what part of payload, payload plus url etc. Further, the configuration information includes if prefixes/suffixes are used after the signing/hashing, and if yes, where in the input message (e.g., a webhook post) may they be found. In an aspect, the JSON file has different fields corresponding to these different points of variability. In an aspect, for each application, the configuration template provides the steps for performing the validation according to the validation technique used by the application.

In an aspect, the receiver system includes an application integration platform (e.g., IBM's APP Connect) that helps a user to integrate different applications. In an aspect, the generic validation API 162, the generic validation library 164, and the configuration template 166 may be part of an application integration suite that is responsible for performing validation of webhook calls in accordance with aspects of the present disclosure and forwarding the calls to another system (e.g., client system 170 or another application server) on successful validation for further processing. In an aspect the receiver system may be representative of a web server or client computing system, or a combination of one or more servers and client computing systems.

Client system 170 is included to be representative of a general purpose computing system, such as a desktop or laptop computer hosting software applications that may be installed and run locally, or may be used to access applications (e.g, APPS 1, 2, n) running on one of the servers 110, 120, and 130 or the receivers system 160. For example, client system 170 includes a web browser 172 used to access a server (e.g., 110, 120, or 130) by rendering web pages from running applications (e.g., APPs 1, 2 or n) on the servers 110, 120, and 130. In certain aspects, the client system 170 may run a local application 174 that is installed and runs on the client system 170. In certain aspects, the local application 174 may be representative of a component of a client server application (or other distributed application) which can communicate with a server (e.g., 110, 120, 130 or receiver system 160) over the network 150. For example, the local application 174 may be a "thin" client where the processing is largely directed by the local application 174, but performed by computing systems of the server (110, 120, 130, or receiver system 160).

In certain aspects, a user of the client system 170 may access APIs (e.g., APIs 1, 2, n) provided by applications servers (110, 120, and 130) to configure webhook calls including registering URLs and events that trigger webhook posts. In certain aspects, the client system 170 may receive webhook calls forwarded by the receiver system after the webhook calls are validated by the receiver system 160. For example, the receiver system 160 may include an Application Integration Platform (not shown) validating webhook calls received from each of the application servers 110, 120, and 130 in accordance with aspects of the present disclosure, and forwarding the webhook calls to the client system 170 if the calls are successfully validated.

Figure 2:
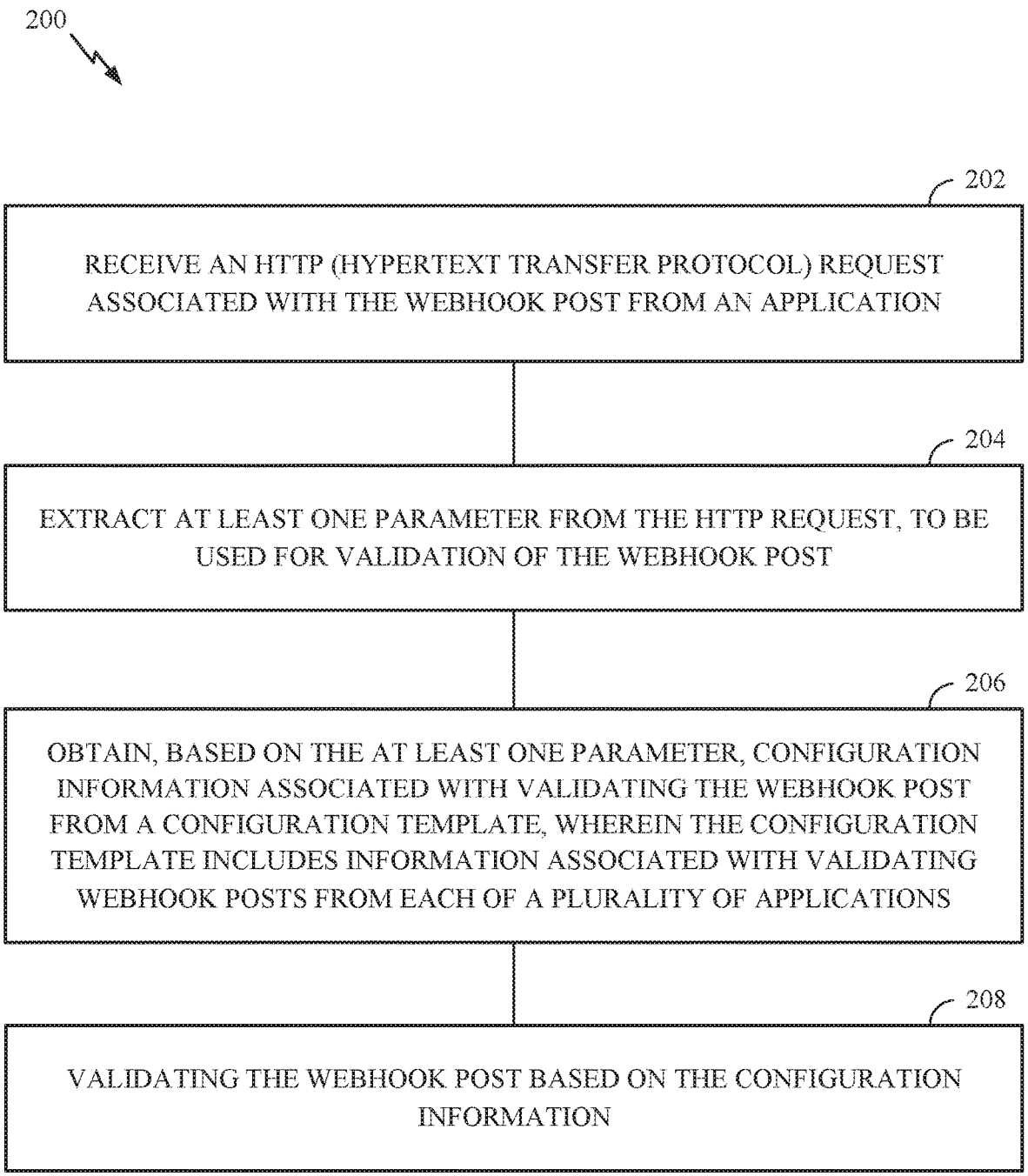
FIG. 2 illustrates example operations 200 that may be performed by a receiver system for validating webhook calls, in accordance with certain aspects of the present disclosure.

FIG. 2 illustrates example operations 200 performed by a receiver system to validate webhook calls, according to one embodiment. In an aspect, the receiver system includes the receiver system 160 shown in FIG. 1. Operations 200 begin, at 202, by receiving an HTTP request associated with a webhook post from an application. At 204, at least one parameter is extracted from the HTTP request, to be used for validation of the webhook post. At 206, configuration information associated with validating the webhook post is obtained from a configuration template, based on the at least one parameter. In an aspect, the configuration template comprises configuration information associated with validating webhook posts from each of a plurality of applications. At 208, validation of the webhook post is performed based on the configuration information.

Figure 3:
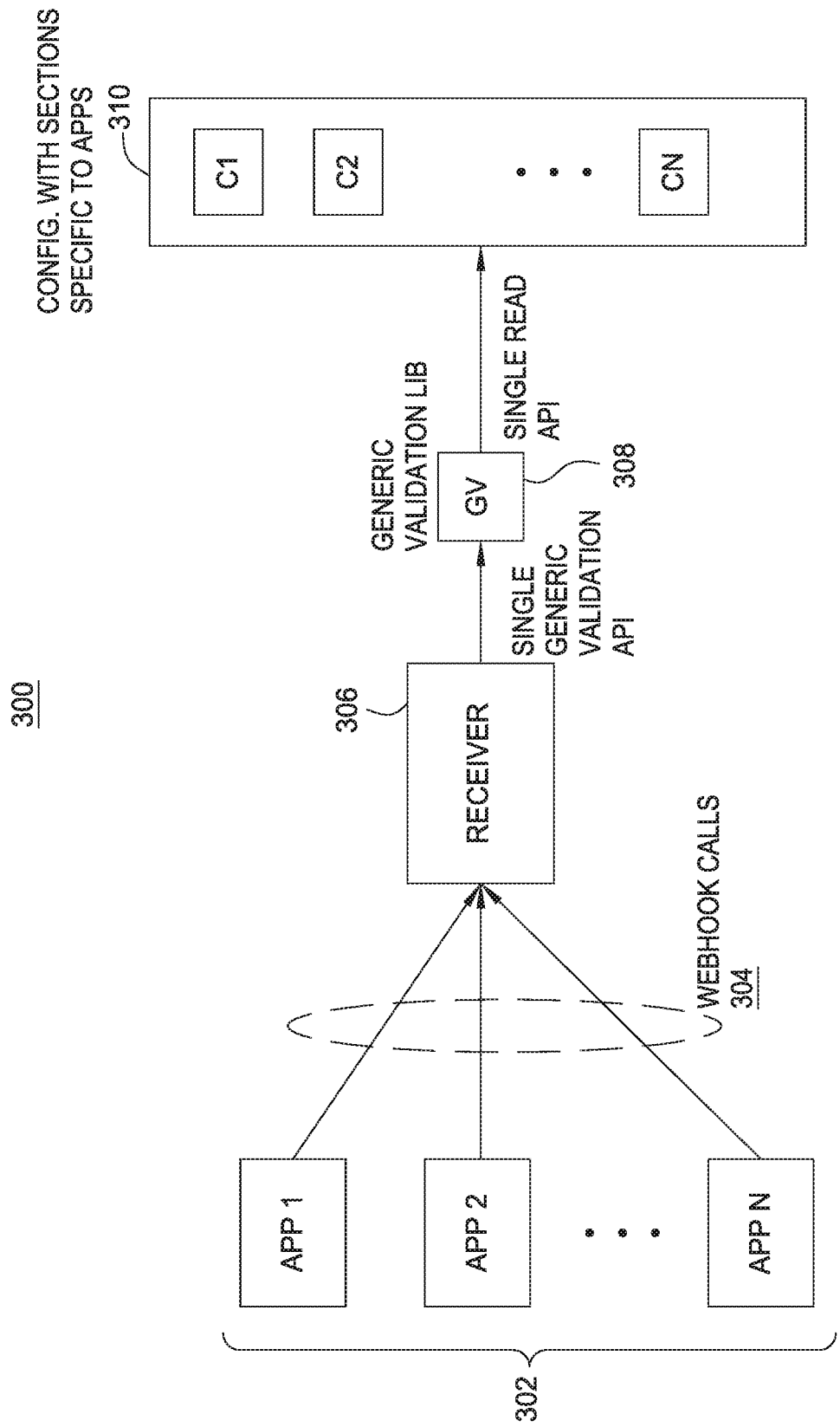
FIG. 3 illustrates an example logical representation 300 of webhook validation in accordance with certain aspects of the present disclosure.

FIG. 3 illustrates an example logical representation 300 of webhook validation in accordance with certain aspects of the present disclosure. As shown in FIG. 3, applications (APPs) 1-n referred to by reference numeral 302 are applications that expose events and support webhook HTTP POSTs triggered by one or more of the exposed events. Receiver 306 may be configured to receive one or more webhook calls 304 from applications 1-n. For example, a user may register a URL associated with the receiver 306 via APIs provided for each of the applications 1-n and specify what events trigger webhook calls to the registered URL. Whenever specified events occur with regard to an application (e.g., APPs 1-n), webhook calls are triggered and HTTP POSTs are sent to the receiver. In an aspect, the receiver system includes the receiver system 160 shown in FIG. 1.

The receiver 306 may support a generic technique for validating webhook calls 304 based on different validation mechanisms used by the applications 302. As shown, the receiver 306 implements a generic validation library GV 308 using a single generic validation API, that reads a configuration template 310 for extracting configuration information corresponding to a webhook call received from a particular application 302, and performs validation of the webhook call based on the read configuration information. In an aspect, as shown in FIG. 3, the configuration template includes configuration sections C1-Cn corresponding to each of the applications 1-n respectively. Each configuration section C1-Cn may include configuration information corresponding to a particular application including a method for validating webhook calls from that application using the particular validation mechanism used by the application. In an aspect, the receiver may receive an application name of the application posing a particular webhook call as part of the webhook post, and read the configuration section (e.g., C1-Cn) corresponding to the application name.

In an aspect, the implementation of the above discussed generic validation technique binds literals in the configuration information to values in runtime environment, configuration, global variables, local variables or constants using keyword prefixes in the literals.

In certain aspects, the configuration information associated with a particular application may include one or more of a type of validation used by the application (e.g., shared secret, basic authentication, signature/hashing etc.), a validation algorithm used (e.g., SHA 1, SHA256, MD5, Asymmetric key based, etc.), a digest method used (e.g., base64, hex, etc.), input fields of the HTTP request having information to be used for the validation (e.g., input fields to use for signature/hashing) including but not limited to payload, URL, prefixes, suffixes, combination, at least one of prefixes or suffixes to be applied, input field to be validated against (e.g., header/query parameter, name of parameter, etc.), or credentials to be used for the validation algorithm (e.g., keys/credentials to use for the signing/hashing algorithm.

Figure 4:
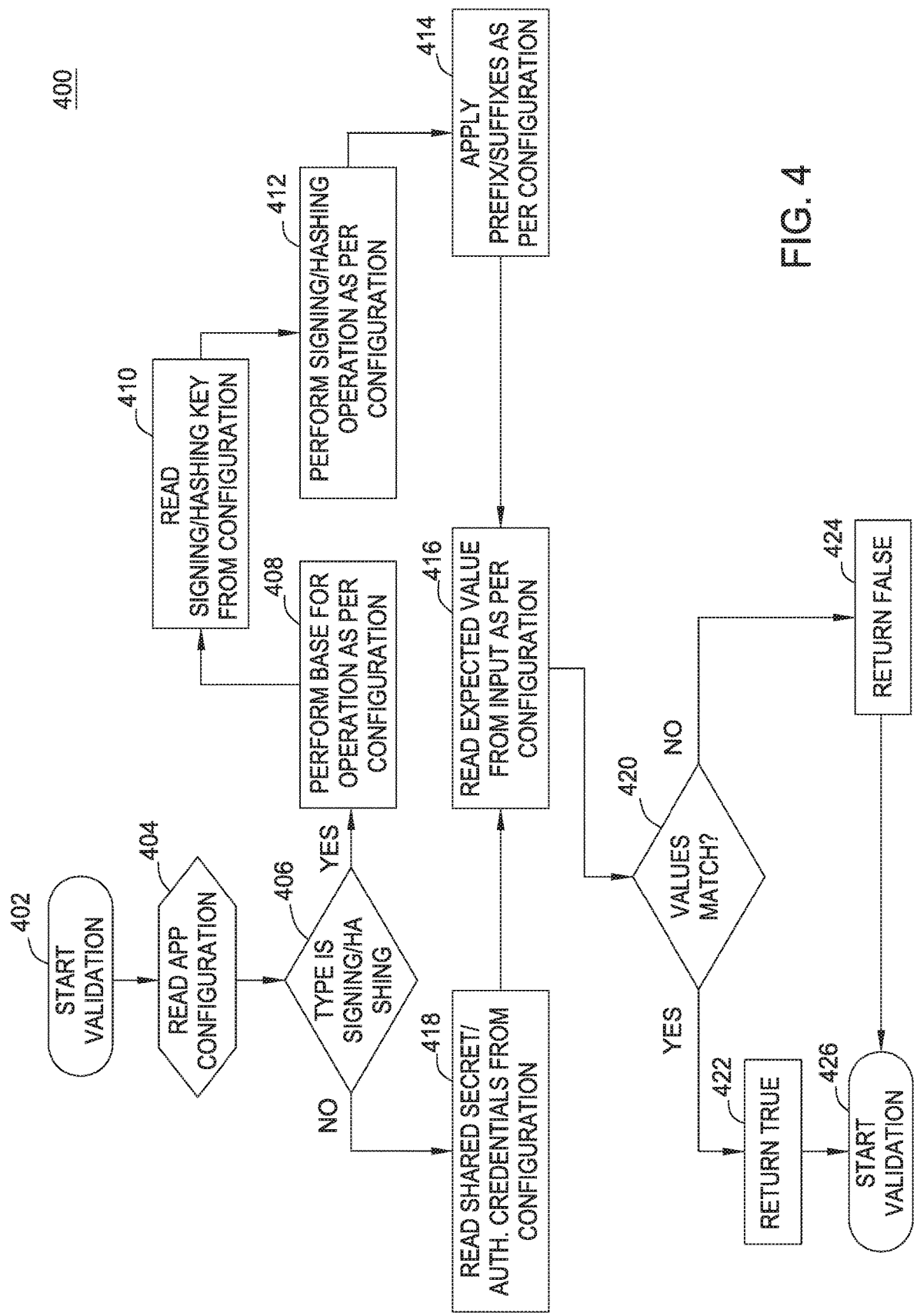
FIG. 4 illustrates example operations 400 that may be performed by a receiver of a webhook call to validate the webhook call based on the validation mechanism used by an application that posted the call, in accordance with certain aspects of the present disclosure.

FIG. 4 illustrates example operations 400 performed by a receiver of a webhook call to validate the webhook call based on the validation mechanism used by an application that posted the call, according to one embodiment. In an aspect, the receiver system includes the receiver system 160 shown in FIG. 1. In an aspect, operations 400 are carried out via a single generic validation API using a generic validation library.

Operations 400 are triggered when the receiver receives a webhook call. At 404, the receiver reads configuration information corresponding to the application that posted the webhook call. For example, the webhook call includes an application name of the posting application, and the receiver reads a configuration section from a generic configuration template (e.g., configuration template 310 of FIG. 3) that corresponds to the application name. At decision block 406, the receiver determines whether the type of validation mechanism used for the webhook call is signing/hashing or not. In an aspect, the configuration information read by the receiver includes information regarding the type of validation mechanism used by the particular posting application. The receiver determines the validation mechanism used for the webhook call based on the configuration information read from the configuration template.

If the receiver determines that the validation mechanism used for the received webhook call is signing/hashing, the receiver prepares a base for further validation operation as per the configuration information. In some cases, different applications use different fields for signing. For example, only payload of the webhook call is signed/hashed, part of the payload is signed/hashed, payload and url are signed etc. This may vary from application to application. Preparing base for validation operation may include extracting this information regarding what part of the received webhook request message is signed/hashed from the read configuration information.

At 410, the receiver reads a signing/hashing key from the configuration information. In an aspect, the signing/hashing key may be configured by the user (using posting application API) or assigned by the posting application and stored as configuration information associated with the posting application.

At 412, the receiver performs signing/hashing operation on the received webhook message based on the read configuration information. For example, the receiver performs the signing/hashing operation on the determined base (determined portion of the request message in step 408) using the determined signing/hashing key (read at step 410). In an aspect, the result of this operation is a hash value.

At 414, the receiver applies any prefixes/suffixes specified in the configuration information to the result of the signing/hashing operation. For example, some posting applications may add a prefix and/or suffix to the result of signing/hashing (e.g., hashed value) before sending the post to the receiver. This prefix/suffix is agreed apriori between the posting application and the receiver and stored as configuration information at the receiver. The same prefix/suffix added by the posting application is added to the hashed value at the receiver for conducting the validation. The result of performing step 414 is generally a string.

At 416, the receiver reads an expected value (e.g, an expected string) from the received webhook request messages. In an aspect, the configuration information includes information regarding where in the received message, the receiver may find the expected value.

At 420, the receiver matches the expected value with the locally determined hashed value. If the two values match the receiver returns a "true" at 422, and the webhook call may be further processed or forwarded to another computing entity for processing. If the expected value and the locally determined values don't match, the receiver returns a "false" at 424, and the webhook call may be discarded.

At decision block 406, if the receiver determines that the validation mechanism used for validating the received webhook call is not signing/hashing, the receiver may read a shared secret or other shared authentication credentials from the configuration information associated with the posting application. In some cases, a posting application may include a secret value in a posted webhook message. The secret value is generally agreed upon apriori between the sender (e.g., posting application) and the receiver, and stored as configuration information associated with the posting application. At 416, the receiver reads an expected secret value received as part of the webhook message, and compares the received value with the secret value read from the configuration information at the receiver at 420. If the secret values match, the receiver returns "true" at 422. If the values don't match, the receiver returns "false" at 424.

Figure 5:
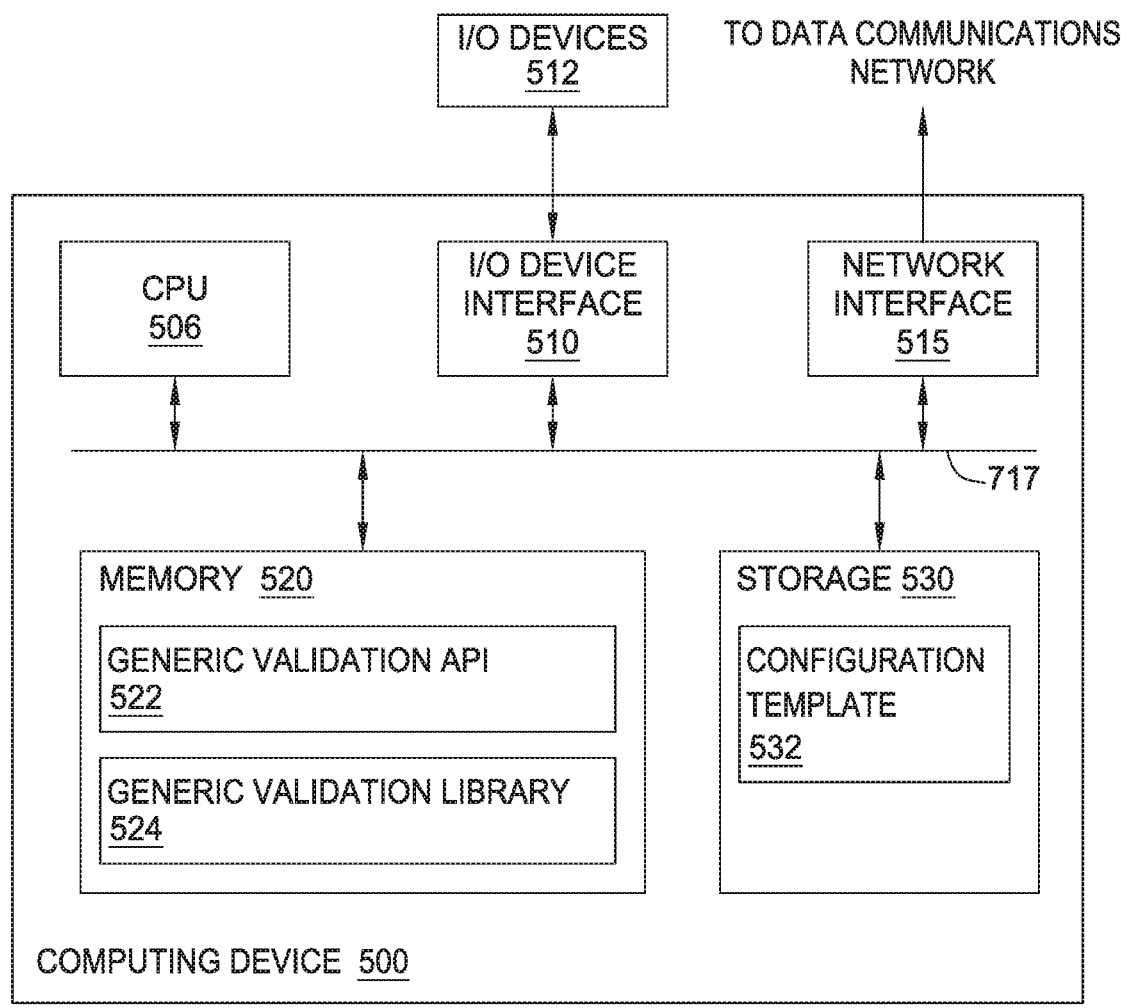
FIG. 5 illustrates an example computing system 500 used to perform generic validation of webhook calls, in accordance with certain aspects of the present disclosure.

FIG. 5 illustrates an example computing system 500 used to perform generic validation of webhook calls, in accordance with certain aspects of the present disclosure. As shown, the computing system 500 includes, without limitation, a central processing unit (CPU) 506, a network interface 515, a memory 520, and a storage 530, each connected to a bus 517. The computing system 500 may also include an I/O device interface 510 connecting I/O devices 512 (e.g., keyboard, display, mouse devices, image capture devices, etc.) to the computing system 500. Further, the computing elements shown in computing system 500 may correspond to a physical computing system (e.g., a system in a data center) or may be a virtual computing instance executing within a computing cloud.

The CPU 506 retrieves and executes programming instructions stored in the memory 520 as well as stored in the storage 530. The bus 517 is used to transmit programming instructions and application data between the CPU 506, I/O device interface 510, storage 530, network interface 515, and memory 520. Note, CPU 506 is included to be representative of a single CPU, multiple CPUs, a single CPU having multiple processing cores, and the like, and the memory 520 is generally included to be representative of a random access memory. The storage 530 may be a disk drive or flash storage device. Although shown as a single unit, the storage 530 may be a combination of fixed and/or removable storage devices, such as fixed disc drives, removable memory cards, optical storage, network attached storage (NAS), or a storage area-network (SAN).

Illustratively, the memory 520 includes a generic validation API 522 and a generic validation library 524. In certain aspect, these components may correspond to the corresponding components discussed with reference other figures, for example, generic validation API 162 and generic validation library 164 shown in FIG. 1.

In certain aspects, the computing device 500 may receive webhook calls (e.g., HTTP POST requests) from other computing entities (e.g., web application servers) over a network (e.g., Internet). The generic validation API 522 provides a single canonical generic validation API that accepts inputs including an HTTP request associated with a webhook call, the application name of the application attempting to post the HTTP request and application configuration information associated to the HTTP request, and uses the generic validation library 524 including code not specific to the application posting the request to perform validation of the webhook call. As shown, the storage 530 includes a generic configuration template 532 that includes at least part of the configuration information associated with validating webhook calls for each application (e.g., APPs 1, 2, n). For example, the configuration information associated with a particular application may include one or more of a type of validation used by the application, a validation algorithm used, a digest method used, input fields of the HTTP request having information to be used for the validation, at least one of prefixes or suffixes to be applied, input field to be validated against, or credentials to be used for the validation algorithm. In an aspect, the configuration template 532 provides steps that need to be followed for validating a webhook call. In an aspect, the generic validation library 522 reads configuration information and the steps regarding validating a webhook request from the generic configuration template 532, and performs the validation based on the configuration.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for an application integration platform to validate a webhook post from a web application to a subscribing application, the computer-implemented method comprising:
receiving, by an application integration platform via a network, a Hypertext Transfer Protocol (HTTP) request associated with the webhook post from the web application to the subscribing application, wherein the webhook post pertains to an event type specified by the subscribing application when registering a webhook via a web application programming interface (API) associated with the web application, wherein the webhook post is triggered by occurrence of an event matching the specified event type, wherein the webhook post comprises a post to the registered webhook;
extracting, by an application integration platform, at least one parameter from the HTTP request, to be used for validation of the webhook post, wherein the at least one parameter indicates an identity of the web application;
using a webhook validation library via a library API and based on the identity of the web application, obtaining from a configuration template configuration information associated with the web application for validating the webhook post, wherein the configuration information specifies a validation scheme for the registered webhook, wherein the application integration platform is configured to validate webhook posts from a plurality of different web applications to a plurality of different subscribing applications using a plurality of different validation schemes; and
upon successfully validating the webhook post by operation of one or more computer processors and based on the obtained configuration information and the validation scheme, forwarding, by the application integration platform via the network, the webhook post to the subscribing application for processing.

2. The computer-implemented method of claim 1, wherein the at least one parameter comprises a name of the web application.

3. The computer-implemented method of claim 1, wherein the configuration information further specifies at least one of a validation algorithm, a digest method, input fields of the HTTP request having information to be used for validation, at least one of prefixes and suffixes to applie, an input field to validate against, and credentials to be used for the validation algorithm.

4. The computer-implemented method of claim 1, wherein the library API comprises a single canonical API, further comprising providing the single canonical API to be used at least for updating the configuration template with configuration information associated with the validation scheme used by the web application.

5. The computer-implemented method of claim 1, wherein the configuration information further specifies how literals used in the configuration information are to be bound to variables in a runtime environment.

6. The computer-implemented method of claim 1, wherein the application integration platform is configured to, upon unsuccessfully validating the webhook post based on the obtained configuration information and the one or more steps, discard the webhook post in lieu of forwarding the webhook post to the subscribing application for processing.

7. The computer-implemented method of claim 6, wherein the configuration template includes configuration information associated with validating the webhook posts from each of the plurality of web applications, wherein the plurality of web applications include a respective web application for each validation scheme selected from HTTP basic authentication, Uniform Resource Locator (URL) shared secret, header shared secret, payload signing, and payload hashing.

8. The computer-implemented method of claim 7, wherein validating the webhook post comprises:
   determining the validation scheme based on the configuration information;
   determining whether the validation scheme is at least one of signing and hashing;
   when the type of validation scheme is determined as signing or hashing, determining from the configuration information which portion of the webhook post is to be at least one of signed and hashed;
   obtaining at least one of a signing and hashing key from the configuration information; and
   performing the hashing or signing on the determined portion of the webhook post using the signing or hashing key to generate a hash value.

9. The computer-implemented method of claim 8, wherein when the type of validation scheme is determined as shared secret, the application integration platform is configured to read a shared secret from the configuration information; wherein validating the webhook post further comprises:
   reading an expected value from the webhook post, wherein the configuration information further specifies information regarding where in the received webhook post the expected value is to be read from;
   comparing the expected value with at least one of the hashed value and the shared secret; and
   determining whether the webhook post is valid based on a result of the comparison.

10. The computer-implemented method of claim 9, wherein the at least one parameter comprises a name of the web application, wherein the configuration information further specifies a validation algorithm, a digest method, input fields of the HTTP request having information to be used for validation, prefixes and suffixes to apply, an input field to validate against, and credentials to be used for the validation algorithm.

11. The computer-implemented method of claim 10, wherein the validation algorithm is, in respective instances, Secure Hash Algorithm 1 (SHA-1), Secure Hash Algorithm 256 (SHA-256), Message Digest Algorithm 5 (MD5), and asymmetric key;
   wherein the digest method is, in respective instances, Base64 and hexademical;
   wherein the input fields are, in respective instances, payload, URL, prefixes, suffixes, and combinations thereof;
   wherein the input field to validate against is, in respective instances, a header parameter and a query parameter.

12. The computer-implemented method of claim 11, wherein the configuration information further specifies steps for performing the validation, wherein the configuration information further specifies how literals used in the configuration information are to be bound to variables in a runtime environment, wherein the configuration template specifies configuration information associated with each of the different validation schemes.

13. The computer-implemented method of claim 12, wherein the API comprises a single canonical API, wherein the computer-implemented method further comprises:
   providing the single canonical API to be used at least for updating the configuration template with configuration information associated with the validation scheme used by the web application.

14. An apparatus configured to provide an application integration platform to validate a webhook post from a web application to a subscribing application, the apparatus comprising:
   means for receiving, via a network, a Hypertext Transfer Protocol (HTTP) request associated with the webhook post from the web application to the subscribing application, wherein the webhook post pertains to an event type specified by the subscribing application when registering a webhook via a web application programming interface (API) associated with the web application, wherein the webhook post is triggered by occurrence of an event matching the specified event type, wherein the webhook post comprises a post to the registered webhook;
   means for extracting at least one parameter from the HTTP request, to be used for validation of the webhook post, wherein the at least one parameter indicates an identity of the web application;
   means for using a webhook validation library via a library API and based on the identity of the web application, obtaining from a configuration template configuration information associated with the web application for validating the webhook post, wherein the configuration information specifies a validation scheme for the registered webhook, wherein the application integration platform is configured to validate webhook posts from a plurality of different web applications to a plurality of different subscribing applications using a plurality of different validation schemes; and
   means for forwarding, via the network, the webhook post to the subscribing application for processing upon successfully validating the webhook post based on the obtained configuration information and the validation scheme.

15. The apparatus of claim 14, wherein the at least one parameter comprises a name of the web application.

16. The apparatus of claim 14, wherein the configuration information further specifies at least one of a validation algorithm, a digest method, input fields of the HTTP request having information to be used for validation, at least one of prefixes and suffixes to apply, an input field to validate against, and credentials to be used for the validation algorithm.

17. The apparatus of claim 14, wherein the library API comprises a single canonical API,
   further comprising means for providing the single canonical API to be used at least for updating the configuration template with configuration information associated with the validation scheme used by the web application.

18. The apparatus of claim 14, wherein the configuration information further specifies how literals used in the configuration information are to be bound to variables in a runtime environment.

19. A computer-readable storage medium having computer-readable program code of an application integration platform embodied therewith, the computer-readable program code executable to perform an operation to validate a webhook post from a web application to a subscribing application, the operation comprising:
   receiving, via a network, a Hypertext Transfer Protocol (HTTP) request associated with the webhook post from the web application to the subscribing application, wherein the webhook post pertains to an event type specified by the subscribing application when registering a webhook via a web application programming interface (API) associated with the web application, wherein the webhook post is triggered by occurrence of an event matching the specified event type, wherein the webhook post comprises a post to the registered webhook;

extracting at least one parameter from the HTTP request, to be used for validation of the webhook post, wherein the at least one parameter indicates an identity of the web application;

using a webhook validation library via a library API and based on the identity of the web application, obtaining from a configuration template configuration information associated with the web application for validating the webhook post, wherein the configuration information specifies a validation scheme for the registered webhook, wherein the application integration platform is configured to validate webhook posts from a plurality of different web applications to a plurality of different subscribing applications using a plurality of different validation schemes; and upon successfully validating the webhook post by operation of one or more computer processors and based on the obtained configuration information and the validation scheme, forwarding, by the application integration platform via the network, the webhook post to the subscribing application for processing.

20. The computer-readable storage medium of claim 19, wherein the at least one parameter comprises a name of the web application.

* * * * *